(12) United States Patent
Johnson

(10) Patent No.: US 6,295,607 B1
(45) Date of Patent: *Sep. 25, 2001

(54) SYSTEM AND METHOD FOR SECURITY CONTROL IN A DATA PROCESSING SYSTEM

(75) Inventor: Robert D. Johnson, Kingwood, TX (US)

(73) Assignee: Bindview Development Corporation, Houston, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/056,038

(22) Filed: Apr. 6, 1998

(51) Int. Cl.[7] .............................. G06F 11/30; H04L 9/00
(52) U.S. Cl. ............................... 713/200; 709/229
(58) Field of Search ................... 713/200, 201, 713/202; 709/225, 226, 229

(56) References Cited

U.S. PATENT DOCUMENTS

| 5,305,456 |   | 4/1994  | Boitana ........................ 395/700 |
| 5,499,297 |   | 3/1996  | Boebert ........................ 380/23 |
| 5,710,883 | * | 1/1998  | Hong et al. ................... 709/246 |
| 5,757,925 | * | 5/1998  | Faybishenko .................. 380/49 |
| 5,794,044 | * | 8/1998  | Yellin ............................. 395/704 |
| 5,918,228 | * | 6/1999  | Rich et al. ..................... 707/10 |
| 5,970,227 | * | 6/1998  | Dayan et al. .................. 395/186 |
| 5,974,566 | * | 10/1999 | Ault et al. ..................... 714/15 |
| 6,035,402 | * | 3/2000  | Vaeth et al . .................. 713/201 |
| 6,044,403 | * | 3/2000  | Gerszberg et al. ............ 709/225 |
| 6,061,795 | * | 5/2000  | Dircks et al. .................. 713/201 |
| 6,212,635 | * | 4/2001  | Reardon ........................ 713/165 |

* cited by examiner

*Primary Examiner*—Dieu-Minh Le
(74) *Attorney, Agent, or Firm*—Shaw Pittman LLP

(57) ABSTRACT

Disclosed is an application and system for controlling security in a data processing system. The security application is adapted to communicate with a client, with a first target application, with a second target application, with security provisions associated with the target applications, and with a manager. The security provisions of the first and second target applications are adjustable. The security application is also adapted to receive information from the manager and can adjust the security provisions associated with the first and second target applications based on the information received from the manager, thereby controlling the client's access to the first and second target applications. The security system includes a security server adapted to communicate with a client, a first and second target application, and a manager. The first and second target applications include adjustable security provision information, which the security system adjusts based on instructions received from the manager.

14 Claims, 8 Drawing Sheets

SAP Transport Request - New Job    Define New Job

| | | |
|---|---|---|
| WHAT | Transport Number | EP3K4 |
| | JOB | J4327 |
| | ROLES | R4002, R4003, R5205 |
| WHERE | Transport Target: | EP3(010)    ALL.Systems.n.Clients |
| WHEN | Select Schedule: | ○ Immediate  ● Next Wednesday@7pm  ○ Next Friday |
| WHY | Comment(s) | Type: Role<br>ASSOCIATE: Financial 30 day clerk |
| WHO | Technical Contact: | |

- Review General Advisory
- Review Pending SAP Transports
- Post New Change
  - Post General Advisory
  - Post SAP Transports
  - Review Change(s)
  - Review User access
    - SAP Users: EP1(100) by ID
    - SAP Users: EP1(100) by Name

*FIG. 5*

SAP Transport Request - New User ID

| | | |
|---|---|---|
| WHAT | Transport Number | EP3K7 |
| | User ID | TDSA: φφ3 |
| | Job | J4327 |
| WHERE | Transport Target: | EP3(010) ALL.Systems.n.Clients |
| WHEN | Select Schedule: | ○ Immediate ⊙ Next Wednesday@7pm ○ Next Friday |
| WHY | Comment(s) | Type: User<br>Associate: Financial 30 day clerk<br>Name: Robert, Gary |
| WHO | Technical Contact: | |

- Review General Advisory
- Review Pending SAP Transports
- Post New Change
  - Post General Advisory
  - Post SAP Transports
- Review Change(s)
- Review User access
  - SAP Users: EP1(100) by ID
  - SAP Users: EP1(100) by Name

*FIG. 6*

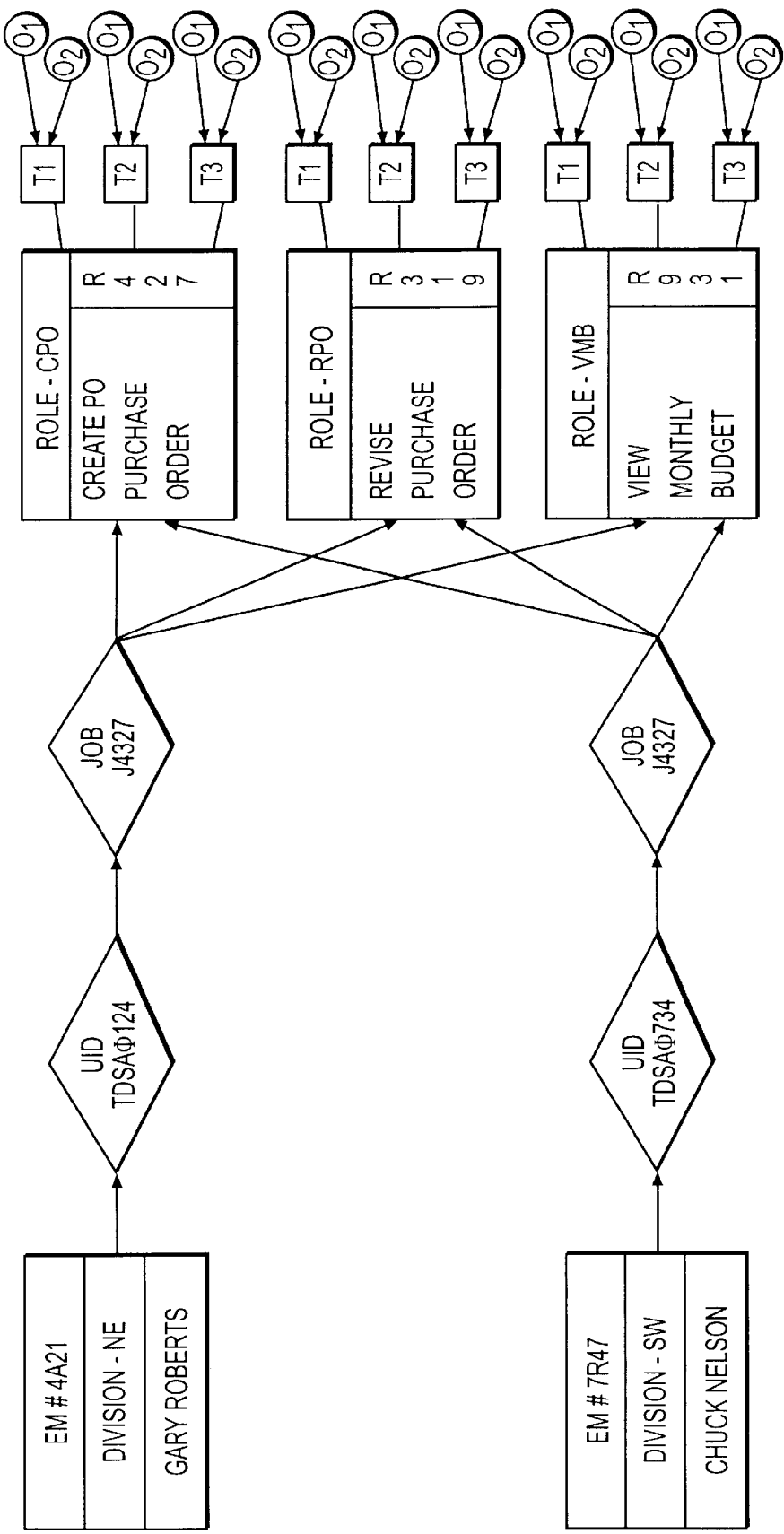
FIG. 7  BEFORE

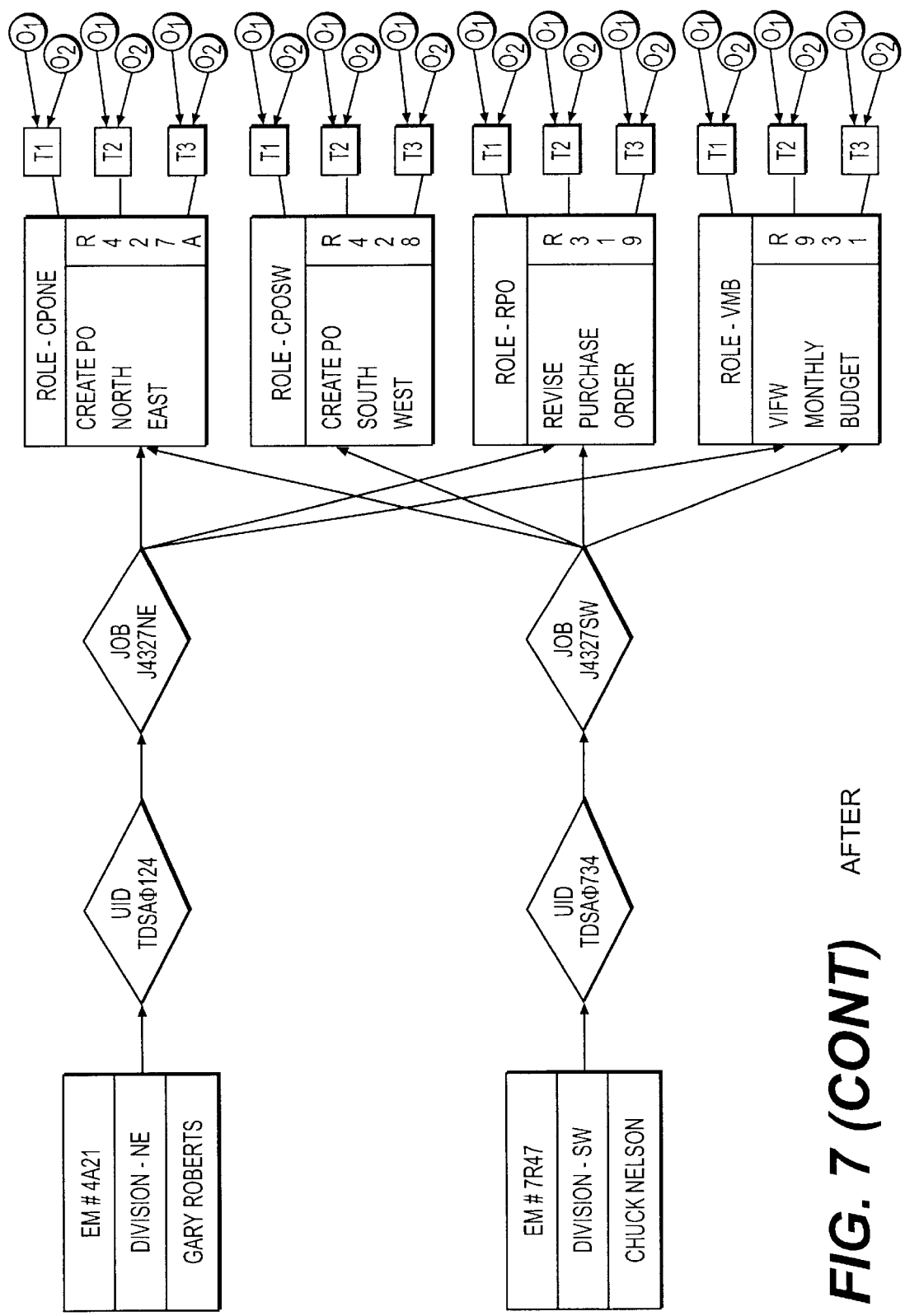
FIG. 7 (CONT)  AFTER

SYSTEM AND METHOD FOR SECURITY CONTROL IN A DATA PROCESSING SYSTEM

BACKGROUND OF THE INVENTION

1. Field of the Invention

This invention relates generally to data processing systems and more specifically to methods and systems for controlling access to information and applications in such systems.

2. Background of the Invention

Many if not all installed computer systems contain information, applications and functions that must be restricted to access by particular subsets of users. Restricted access may take place at a number of levels. In one sense, the physical location of a computer terminal may form the primary basis for secure access to a computer system. If a user can not physically access a terminal, client or server (or path to any of the above) storing an application or data, the user will not be able to gain access to that desired application or data. While this level of security is important, the realities of the typical corporate environment necessitate further levels of security. This is because, in practice, all or most employees will generally have access to a physical link (i.e. terminal or client) to all applications, data and other resources resident on the corporate network.

As such, further security controls have been and continue to be necessary in order to allow controlled access to resources located on computer systems. Such controls are typically provided through software running on the computer system. Various levels of controls are provided. At the highest level, access to the computer network is typically controlled through a system user id (UID) and password. Thus, while anyone may potentially access the physical equipment providing a link to all available resources, only those that have been authorized through the provision of a UID and/or a password may "log on" to the system so as to access any resources available through the system. Access is generally provided through one or more security files (each associated with a resource or set of resources) listing the authorized UIDs and, if applicable, the passwords associated with such UIDs. As would be expected, access to these security files themselves is quite restricted. In most cases, however, satisfying the criteria necessary to pass a first level of security (i.e. entering a correct USD and/or password) will permit a user to access the system at an operating system level.

Once this has been achieved, the next level of security typically present in these systems is at an application level. Thus, after access at the operating system level, various applications will be presented to the user for selection. In a Windows 95/NT environment, for example, each of the available applications may be represented by an icon displayed on the desktop. In order to access any of these applications and/or the data associated with such applications, the user may need to have a second UID and/or password. In this case, the system will typically contain two separate security files; one for system access and one for application access. Alternatively, the user's system level UID and/or password may control access at the application level as well. In this latter case, there may be two different security files (one controlling system access and the other controlling application access) present on the system, both of which would contain the same UID and/or password corresponding to a user which has access to the particular application and/or associated data.

An additional level of security which is often provided occurs within a particular application. Thus, for example, a user with access at the system level and at the application level may, nevertheless, be restricted as to what functions he or she can perform within a particular application once access to that application has been granted. A user may also be restricted from accessing particular data associated with an application even though the user has access to the application. Security files similar to those described above and associated with the specific applications are used to control this process. In this case, application level security is maintained at the file level. A user with access to a database program may be restricted with respect to particular data associated with the database application. For example, it may be that a particular user/employee in the human resources department might have access to a compensation database while that same employee would not have access to a manufacturing parts database.

In most cases, especially in the case of medium and large network systems, one or more individuals are tasked with administrating the operation, maintenance and configuration of the corporate data processing system. Such individuals are referred to herein generically as administrators by virtue of, among other things, their heightened security privileges with respect to security files and other administrative resources. Often, one or more administrator(s) is/are responsible for maintaining the above described security files as well as other matters in connection with controlling access to system resources. In current systems, however, the administrator's tasks are difficult and time consuming for many reasons.

First, the addition and deletion of employees as employees are hired or leave requires constant attention to the security files on an ongoing basis. This can be a time consuming process in that an administrator must typically access security files directly and manually manipulate them to reflect the current state of privileges with respect to system resources. Second, because large systems often contain multiple applications, multiple databases, multiple files and even multiple operating systems, each time a new user is added or deleted, a significant number of security files must be updated for each user addition/deletion. This can be very time consuming and is prone to a number of errors. Perhaps more significantly, new users typically experience a significant lag time before the administrator gets around to updating security files to give the user the specific access authorities to which the user is entitled.

Another problem with existing security administration is the fact that administrators must have specialized knowledge in order to be able to make the required changes as new users are added to the system, as existing users are deleted from the system or as security privileges change due to, for example, job function changes. For example, in order to effect a security access change in the typical corporate environment, an employee must have his or her manager fill out a form for the manager's signature. Once this is done the form must be routed to the appropriate administrator for manual and time consuming updates to, in most cases, multiple security files. Until this process is completed, the user can not exercise his or her new security access rights.

One particular way in which system developers and system configurers have attempted to deal with many of these problems is to severely limit the number of separately controllable categories of access rights. For example, rather than providing a separate bundle of rights for a particular job position, systems are often designed where many jobs are bundled together such that all jobs in the bundle have the same rights. In an extreme case, all users of the system be provided with access to all resources available in the system. While this is relatively easier to administrate and maintain (since less updates need to be performed and less security files exist) the security in such a system is often less than satisfactory.

SUMMARY OF THE INVENTION

Accordingly, there is a need for a security control system and method whereby changes to security access attributes may be quickly, efficiently and accurately processed.

The present invention provides these and other advantages through a Security Administration System (SAS) that automates the processing of security administration functions. In a preferred embodiment of the present invention, the SAS runs in a client server environment. The SAS runs on a server logically connected between each of the clients and one or more target/application servers 30. Alternatively, the SAS may run on the same physical server as the target application.

In a particular preferred embodiment of the present invention, a security file update is processed as follows. A client intending to perform the update requests one or more hypertext markup language (HTML) pages indicative of the type of update to be performed from the SAS server. The SAS server then transmits the page(s) to the client and the client displays a form, via a Graphical User Interface (GUI) through which the user may input information concerning the particular update. Once this has been done, the information and corresponding HTML code is transmitted to the SAS server where it is processed to ultimately generate the necessary output to accomplish the security file update. Typically, this output is in the form of the native application language (or some form easily translatable to native application language) corresponding to the application, database, or operating system associated with the requested security change.

As such, the present invention eliminates the need for an administrator with specialized knowledge in order to accomplish routing security administration. Additionally, the responsibility for at least some portion of basic security administration may be distributed among multiple users (e.g. managers) without the need for such users to have any specialized knowledge concerning security files, system administration or the like. In this way and using the system of the present invention, an employee's manager could, for example, permit a new employee under him or her to access the system immediately through the entry of basic data via a user friendly graphical user interface.

It is a principal object of the present invention to provide for a security control system which can automate and distribute application security administration for a variety of target applications.

It is another object of the present invention to provide a security control system which allows for controlled decentralization of the security administration function.

In accordance with these and other objects which will be apparent hereinafter, the instant invention will be described with particular reference to the accompanying drawings.

BRIEF DESCRIPTION OF THE DRAWINGS

The foregoing and other objects, features and advantages of the invention will be apparent from the following more particular description of the preferred embodiments of the invention, as illustrated in the accompanying drawings in which like reference numerals refer to like components throughout the different views and illustrations.

FIG. 5 is an exemplary screen shot illustrating the client GUI in the case of a DEFINE NEW JOB ROLES transport;

FIG. 6 is an exemplary screen shot illustrating the client GUI in the case of a NEW USERID transport;

FIG. 7 is a relational diagram illustrating various data relationships in connection with an example of the operation of the SAS system according to a preferred embodiment of the present invention.

DESCRIPTION OF THE PREFERRED EMBODIMENTS

The present invention provides a flexible, user-friendly and otherwise advantageous method and system for managing and processing security transactions. While the invention is disclosed with respect to particular specific embodiments, it will be understood that the teachings of the present invention may have broad application in a wide variety of data processing environments.

Figure 1:
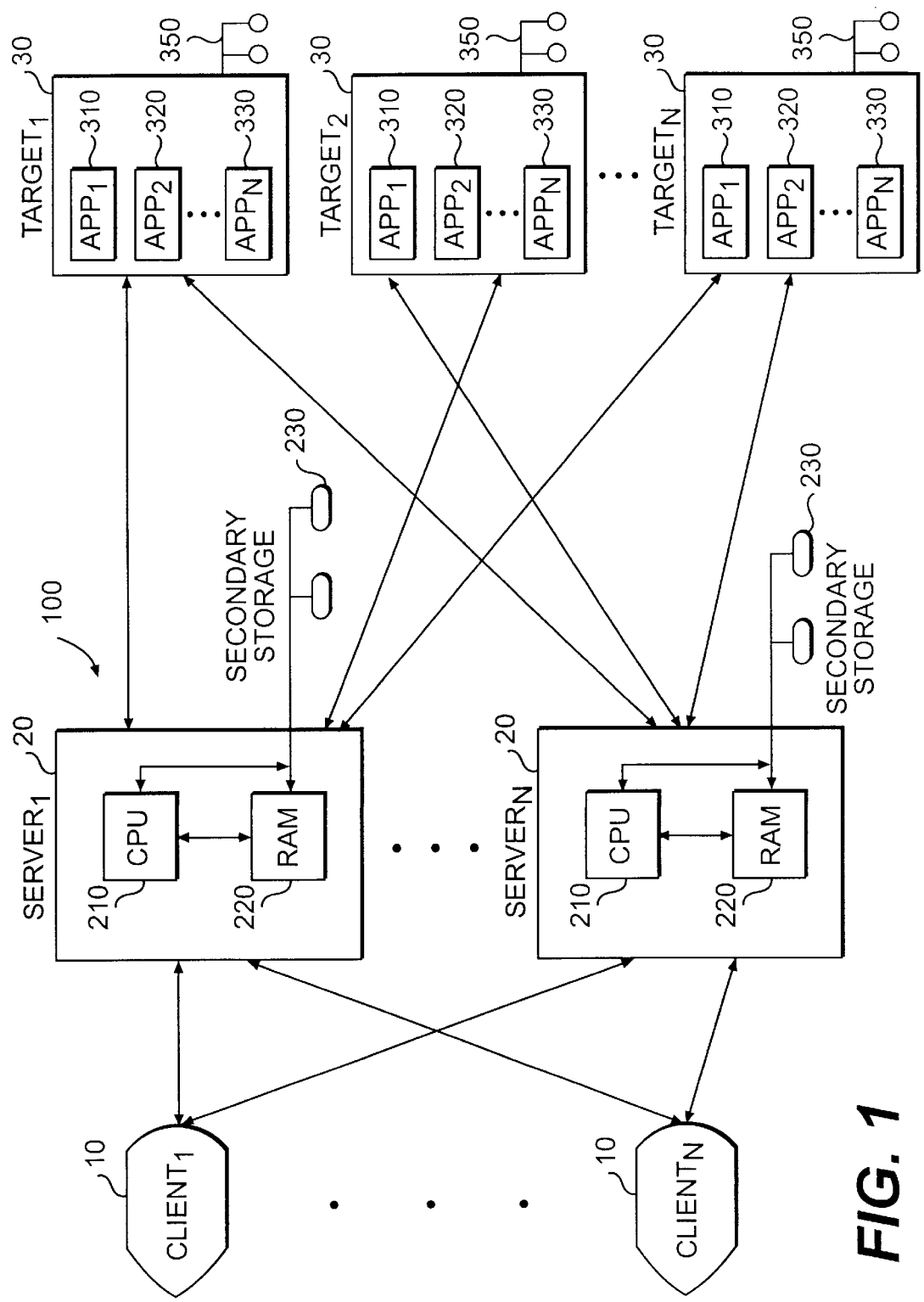
FIG. 1 is a block diagram of a data processing system which may particularly benefit from the teachings of the present invention.

Turning now to FIG. 1, one embodiment of a data processing system 100 to which the teachings of this invention may be applied is illustrated. While FIG. 1 is indicative of a client/server environment, the invention is likewise applicable in a mainframe environment where access is provided either through intelligent clients or through one or more dumb terminals. In a preferred embodiment of the present invention, at least one client 10 (but typically multiple clients 10) are in communication with at least one server 20 (but typically multiple servers 20) which are in turn in communication with at least one target server 30. Client 10 may be a personal computer, a dumb terminal or any other device which provides data entry, data display and communication and transmission capabilities. For example, each client 10 may be a personal computer connected through an Ethernet or LAN connection to each of the available (or a subset of the available) servers 20 in data processing system 100. Client 10 preferably includes a display screen and locally present software necessary to provide a graphical user interface (GUI) to the user. Client 10 may be running a personal computer operating system such as Microsoft Windows 3.X, Windows 95, or Windows NT. Client 10 also preferably includes a keyboard and/or mouse (not shown) providing the ability for a user to input data through the above-mentioned GUI. Clients 10 may also store and execute locally resident applications. Finally, client 10 preferably has a local copy of an HTML browser application such as Microsoft Internet Explorer or Netscape Navigator.

Data processing system 100 further includes at least one server 20, each in communication with one or more of clients 10. Servers 20 preferably run under Windows NT. Servers 20 may further include various application programs selectively accessible by users stationed at clients 10. These applications are executed by CPU 210 while such application is in random access memory (RAM) 220. Servers 20 may contain multiple CPUs and may have various memory configurations. Servers 20 may further include various forms of secondary storage 230 which may comprise, for example, one or more hard drives, DASD devices, tape devices or optical storage devices. Secondary storage 230 may contain application programs, operating system code and other support routines used in connection with the operation of SAS Server 20.

One or more target servers 30 are also included as part of data processing system 100 in a preferred embodiment of the present invention. One or more application programs 310–330, databases (not shown) and/or other resources reside on target servers 30. Secondary storage 350 contains security files associated with applications 310–330 located on target server 30. Access to and available functionality concerning the applications 310–330, databases and other resources residing on target server(s) 30 (or alternatively on servers 20) may be selectively controlled according to the teachings of the present invention. Target server(s) 30 communicate with server(s) 20 in order to exchange data and selectively permit or deny access to resources available on target servers 30. Target servers 30 also contain one or more security files as discussed above. These security files store information regarding access rights to resources within data processing system 100 including access to applications 310–330 and data processed by such applications. Security files may be simply a listing of UBDs having access to a particular resource or set of resources on data processing system 100. The security files may also contain passwords associated with these UIDs as well as information which is indicative of particular rights with respect to particular resources. Security files may be loaded into RAM or cache (not shown) of target server 30 during system operation. Target server(s) 30 also includes various secondary storage devices 350 for storing application programs, files, databases, security files and other resources selectively available to users of data processing system 100.

Figure 2:
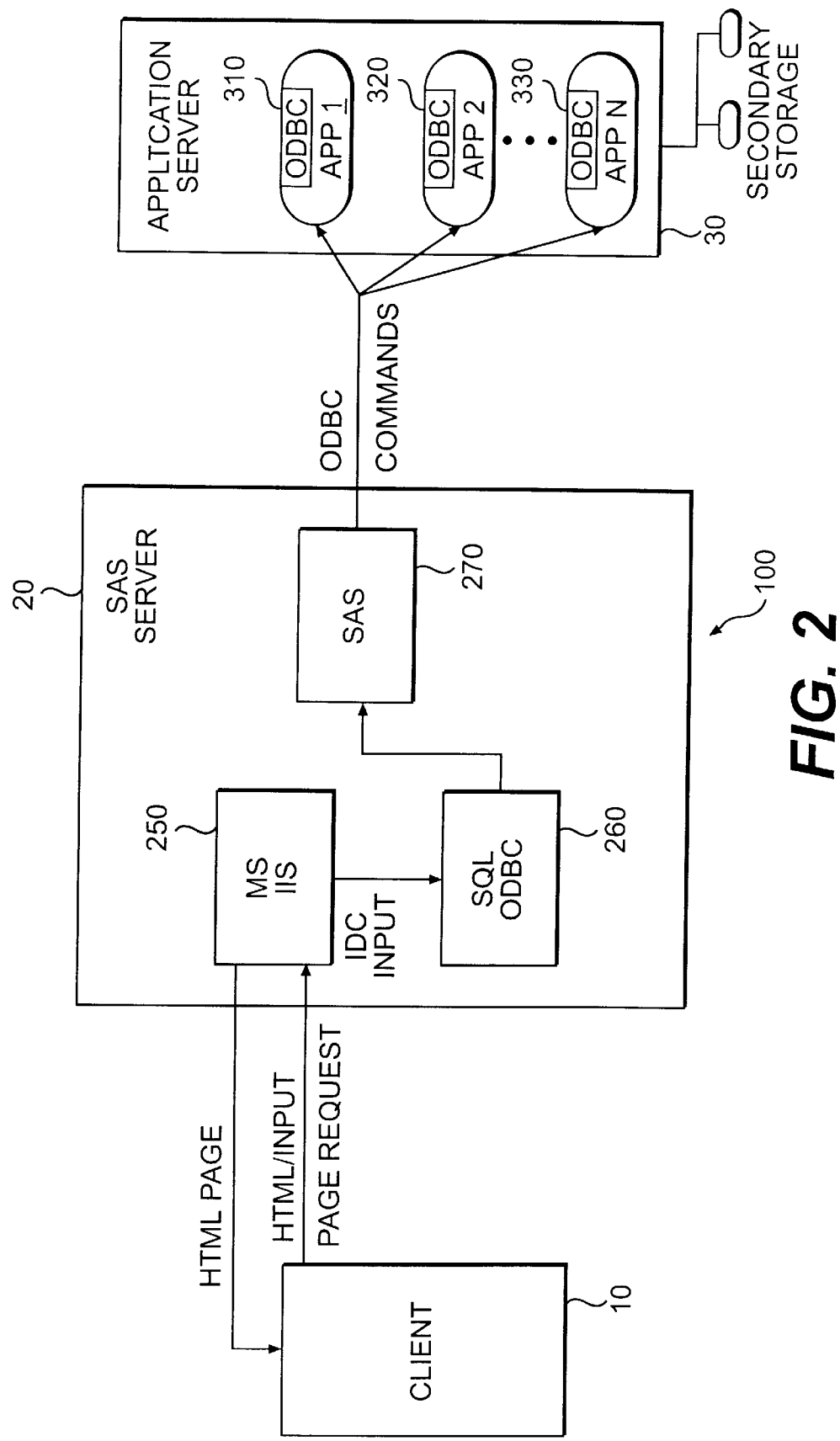
FIG. 2 is a block diagram of a data processing system employing the SAS of the present invention.

FIG. 2 is illustrative of the components of the security control subsystem operative in connection with data processing system 100. FIG. 2 also shows data flow between and among these components. In a preferred embodiment of the invention, client 10 may be a personal computer running the Microsoft Windows 95 operating system or the Microsoft Windows NT operating system. Client 10 is also equipped with a browser application providing a graphical user interface. In a preferred embodiment of the present invention, the resident browser is Microsoft Internet Explorer.

Client 10 communicates with SAS server 20 through a network such as token ring or Ethernet. In this manner, client 10 may transmit and receive data from SAS server 20 on a real time basis. SAS server 20 may be any server capable of handling traffic from all clients 10 to which it is connected. Alternatively, multiple SAS servers may be present in data processing system 100. The primary function of SAS server 20 is to provide controlled access to resources available on application servers 30. However, as mentioned above, SAS server 20 may also store applications or other resources which are selectively available to users under the control of SAS server 20 and in particular Security Administration Subsystem (SAS) 270. Preferably, any such other applications and resources are subject to the same control and process restrictions applicable to SAS 270 or any of its subcomponents.

Client 10 may further interact with various application programs 310–330 resident on application/target server 30 but only through SAS server 20. Thus, access to and use of application programs 310–330 is controlled both through selective hardware access and through software controls both of which together form the basis for the present invention.

SAS server 20 includes a number of applications resident thereon. In a preferred embodiment of the present invention SAS server 20 runs under the Microsoft NT operating system. Microsoft Internet Information Server 4.0 (MS H1S) 250 is preferably resident on SAS server 20 and communicates with the browser application resident on client 10. MS IIS 250 provides features such as HTML editing, HTTP support and content and configuration support and control for intranet web hosting applications.

In a preferred embodiment of the present invention, communication between client 10 and SAS server 20 occurs through the transmission back and forth of HTML files representing web (GUI) pages and information (as well as other data formats) input by a user stationed at client 10. Data processing system 100 permits SAS server 20 to transmit HTML pages (represented as files) to client 10 in response to a client 10 request therefor. MS IIS 250 is capable of receiving HTML input from client 10 and stripping raw input data therefrom.

MS IIS 250 employs an Internet Database Connector (IDC) to control NT security at a page level. Additionally, in a preferred embodiment of the present invention, the NT based SAS server 20 uses 32 bit Application Programming Interfaces (APIs) with a platform that is NT certified. The APIs generate the HTML which is transmitted to client 10.

SAS server 20 also includes the Microsoft SQL Object Database Connector (ODBC) application 260 which receives and selectively stores raw input data which is output from MS IIS 250. Security application subsystem (SAS) 270 accesses the data stored by ODBC 260 and processes it to generate a command set comprising ODBC commands which are transmitted to application server 30. These ODBC commands may be translated by an ODBC protocol layer present in each of applications 310–330. As a result, security files associated with these resources may be automatically updated without manual intervention. In this way, access to applications 310–330 as well as the data associated therewith may be selectively and automatically controlled at the direction of a user working at client 10 without the need for direct access to security files.

Alternatively, the present invention may be implemented using servers other than NT based servers provided that it is preferable for such server to be capable of multitasking and be based upon at least a 32 bit architecture.

Figure 3:
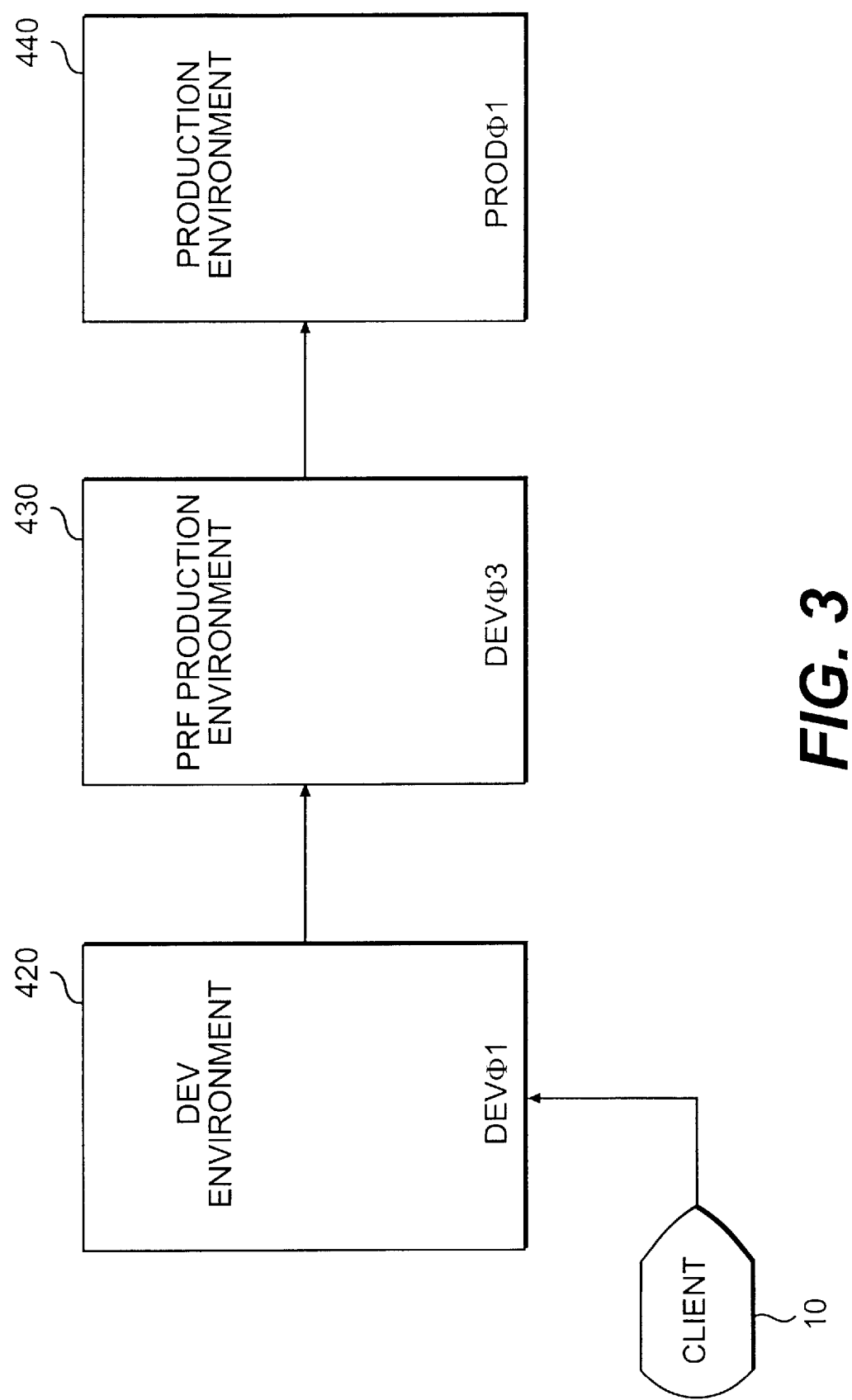
FIG. 3 is a diagram illustrating the relationship between various development and production environments in a preferred embodiment of the invention.

FIG. 3 depicts a typical operational environment allowing for the development and maintenance of data processing system 100 as well as applications, databases, files and other resources selectively available thereunder. In the typical life cycle of data processing system 100, from installation on, various modifications will often be required with respect to UIDs, application programs, databases, files and other resources as well as the security privileges pertaining to each. In order to orderly, accurately and efficiently effect these changes, the data processing system 100 of the present invention provides, in a preferred embodiment, at least two environments for the development and operation of data processing system and each of its components.

In operation, while development, modification, maintenance, debugging, etc. of applications is taking place, the "work in progress" is stored in development environment (EP01) 420. In this way, the production system (EP03)

440 is not affected by ongoing changes until these changes have been adequately tested and debugged. A third environment, preproduction environment (EP02) 430 may also be included as a staging environment, prior to introduction of the development version into the production environment 440. As would be apparent to one of skill in the art, such a sequential introduction of development versions into the final production environment 440 is very important in assuring that the production environment 440 continues to operate effectively and as expected.

Figure 4:
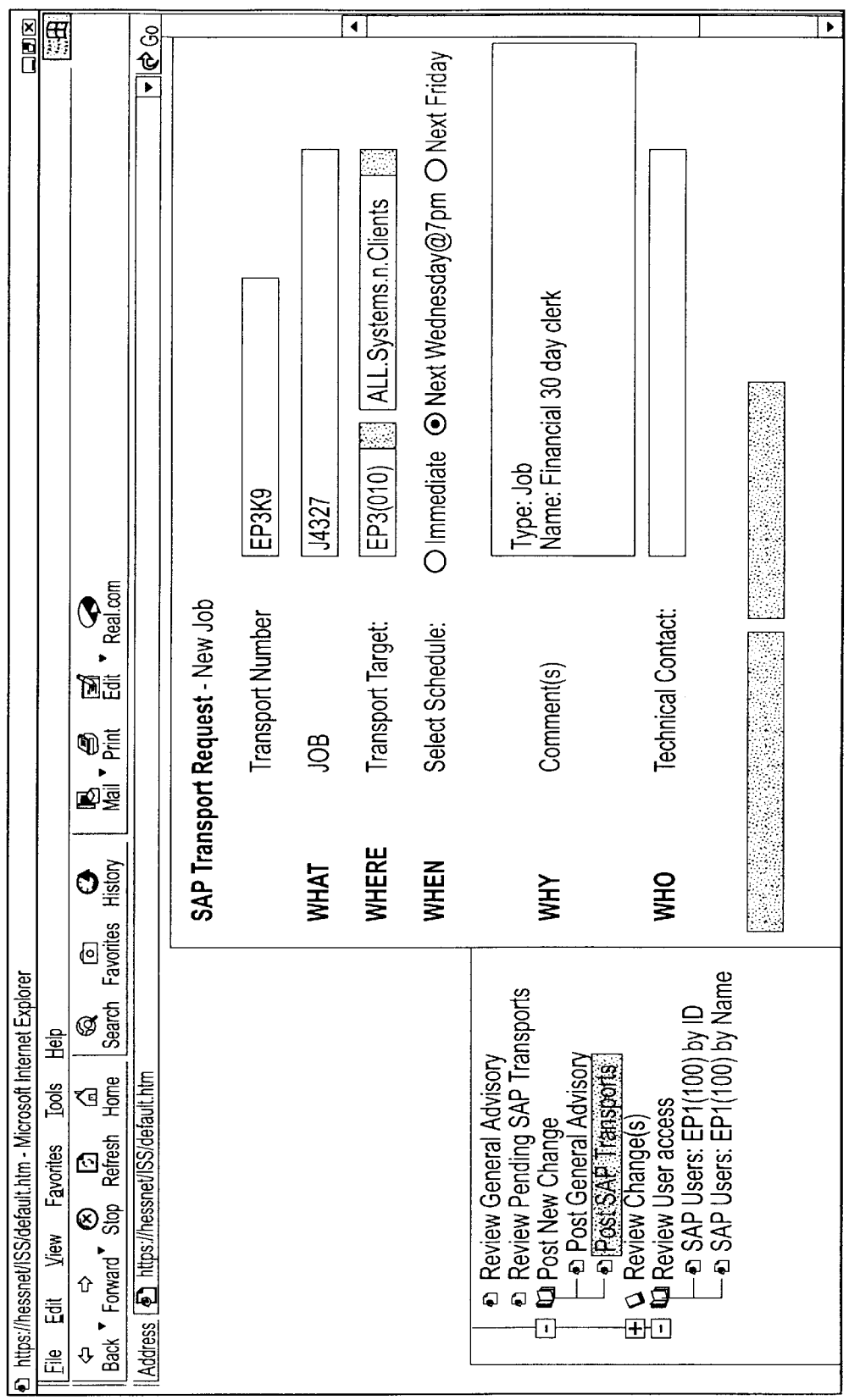
FIG. 4 is an exemplary screen shot illustrating the client GUI in the case of a NEW JOB transport.

An example of the operation of data processing system 100 will now be discussed in conjunction with FIGS. 4–6. Although this example is specific to a corporate network system, specific to security control in a collection of SAP R/3 based applications, and specific to the rights of employees with respect to resources on data processing system 100, it should be understood that the teachings of the present invention apply in numerous other environments. For example, and not by way of limitation, instead of rights of employees in a corporate environment, the teachings of the present invention may alternatively be employed to provide selective access to specific data located on a particular server on the corporate network.

Continuing with the example, assume that it is desired to provide a new employee with access to data processing system 100 and that the new employee will be placed in a new JOB. In a preferred embodiment of the present invention, data processing system may handle a large number of users each with their own UID and each assigned to a specific JOB or JOBs. The teachings of the present invention provided for an efficient method for tracking and maintaining a large number of available JOBs and UIDs. Just like UIDs, JOBs are preferably assigned numerical codes and typically correspond to a job title at a corporation.

Also assume that the new JOB is associated only with ROLEs that already exist in data processing system 100. By way of background, in this particular example ROLEs corresponding to particular "functions" which may be performed by users assigned to a specific JOB. For example, a user who is assigned to the JOB of "Financial Clerk" may have access to the following ROLEs: Create Purchase Order, Delete Purchase Order, View Budget Data and the like. In a preferred embodiment of the present invention, new UIDs may easily be created and added to data processing system 100 using the methods of the invention. In other words, the UID attribute is dynamic. Similarly, JOBs are easily created, modified, added and deleted from and to data processing system 100. Again, the JOB attribute is a dynamic attribute in the system of the present invention. As a result of the above, it is possible, and in fact easy, to reassign employees (based upon their unique UID) between and among JOBs. Thus, the system of the present invention may advantageously, for example, change an employee from a financial clerk to a payroll clerk by processing the appropriate transports as discussed below.

Further, in the system of the present invention, JOBs may dynamically be associated with one or more ROLEs. In other words, the ROLEs associated with a particular JOB may be easily changed through the initiation of the appropriate transports as discussed below. On the other hand, the ROLE attribute itself is preferably a static attribute in that particular OBJECTS associated with a particular ROLE are set up at installation and are not intended to be easily modified. OBJECTS are low level discrete entities that perform specific tasks to accomplish desired results initiated at a higher level. In the system of the present invention, OBJECTS are also static attributes in that they are set up ahead of time and are not intended to be modified during the operation of data processing system 100.

It should be understood that UIDs, JOBs, ROLEs and OBJECTS are merely examples of a security hierarchy that might be employed in the data processing system of the present invention. Other hierarchies for differing applications and which relate data and various dependencies related thereto could be easily substituted while still deriving the benefits of the present invention.

Returning to the example, in this case, a manager, could provide the new employee with access as follows:

Step 1: Add NEW JOB—The manager, located at client 10, requests an HTML page through the resident GUI. The GUI may be, for example, a world wide web browser page configured for access to server 20. An example of a page for adding a new JOB as required by step 1 is provided in FIG. 4 which is a screen shot from MS Internet Explorer. After the page request has been made, the requested page will be transmitted from server 20 to the requesting client 10 assuming the necessary access rights to that page are satisfied on both the user and client level. As mentioned above, this may be controlled at server 20 through IDC functionality. As can be seen from FIG. 4, a new JOB is added through the processing of SAP Transport request. SAP R/3 is an application program used to control various business processes. In this example SAP R/3 is application 310 located on target server 30. In this particular example, it is access to the SAP R/3 resources and associated data which is being selectively controlled. While the present invention is particularly suited for application to the SAP R/3 application program and automated security control with respect thereto it is in no way limited thereto. On the contrary, the present invention is applicable to any target application which requires controlled access to particular functionality and/or data comprising all or a portion of the application.

Returning to the example, the manager would fill in the requested data on the NEW JOB page. In this example, it would be necessary for the manager to enter a new JOB ID (J4327) which might be provided to him through a look up table, a separate database or a call to system administration. Additionally, the manager would be required to enter the transport target. In other words, the manager would indicate whether the new JOB is to be added to the development environment 420 (for testing), the preproduction environment 430 (for testing or delayed introduction) or the production environment 440 (for immediate implementation). In this example, the transport target is identified as EP3(010) which may be a code indicative of transport directly to the production environment 440. Data processing system 100 may be set up in a number of ways regarding introduction of transports to the system. For example, data processing system 100 may be configured such that any transport initiated by a manager (non-system administrator) would be automatically introduced into production environment 440. This is because it would be unlikely that such a manager would test the update. This further assumes that it is desired to distribute "security administration" activities throughout the organization rather than centralizing control. In an alternative embodiment, it may be desirable to retain centralized control and introducing all updates first into development environment 420 before they can pass to production environment 440.

Returning again to the example, the manager might also be required to specify which systems, subsystems and/or applications are to be affected by the change. The data entered in the example of FIG. 4 specifies that the update is to take place on a global basis (all systems and clients). Next, the manager may be required to specify when the update is to take place. Provision for delayed transports is preferably included. Finally, the NEW JOB page may further allow for comments and a technical contact associated with the transport. The data in the comment field may include keyword based data that is indicative of the transaction or it may simply be gathered for the purpose of logging, detailing and reporting transactions that occur within data processing system 100. As would be apparent to one of ordinary skill, additional data entry fields may also be included as either permissive or required fields and the data entered may be used for various purposes in connection with security administration and logging. Once all the requested data is entered, the transport is initiated and a new JOB is added to the appropriate security file. In the FIG. 4 example, the "TYPE: Job" entry indicates to the SAS server 20 that this transport is a CREATE JOB transaction and the "Financial 30 day clerk" entry indicates that the new job is a financial clerk.

Step 2: DEFINE NEW JOB—Once the new JOB has been transported to the selected environment, the manager must assign particular ROLEs to the newly added JOB. The manager may access information regarding which ROLEs are available and/or which ROLEs should be assigned to a particular JOB either through a database located on data processing system 100 or through communications or reference materials external to data processing system 100. In the example of FIG. 5, the manager is assigning ROLEs R4002, R4003 and R5235 to the newly added JOB J4327. "Associate: Financial 30 day clerk" indicates that these new roles are to be associated with JOB J4327 (the financial clerk JOB). Once this is done, the transport is launched and the requested association between JOB and ROLEs is reflected in one or more appropriate security file(s).

STEP 3: ADD NEW USERID—As a final step in the exemplary procedure, the manager requests a NEW USE-RID page. This is illustrated in FIG. 6. This page is transmitted from server 20 to client 10 assuming the manager has the necessary access rights to this page. Once the page is received, the manager inputs both the new UID (in this case TDSA003; see FIG. 6) as well as the JOB to which the UID is to be assigned. In this case, UID TDSA003 is assigned to the newly added JOB J4327. "TYPE: User" in the comments field indicates that the transaction calls for the addition of a new UID. The "Associate" line indicates that this UID is to be classified with a JOB of financial clerk and the "Name" line indicates the user name to be associated with the UID.

Each of the above steps is accomplished automatically at the SAS server 20 of the present invention. Thus, as described above, when the manager enters input data into any of the transport pages and launches the page, the entered data is received at SAS server 20 as a stream of HTML code and input data. In a preferred embodiment of the present invention, MS IIS 250 residing on SAS server 20 strips the HTML code from the aforementioned input stream and passes on formatted input data to SQL ODBC 260. SQL ODBC 260 receives the input data stream and generates SQL commands corresponding to the input data. SAS 270 then receives this data and formats it to generate ODBC which may be converted by each target application 310 to its native application language so as to modify the security files associated with the application to reflect the security command processed.

The table below illustrates an example of an IDC/OBDC data set that may be transmined from SAS server 20 to application server 30 as a result of the above discussed transactions. The OBDC communicates with the associated platform using standard SQL commands with associated connection information. This established connection passes on keyed information in accordance with application requirements for security updates.

```
Datasource: ODBC
Template: iss4.htx
RequiredParameters: SearchValue, Context
SQLStatement:
+ if exists (
+    select 'TRUE'
+    where '%Context%' = 'SAPTransports'
+ )
+    SELECT 'SAPTransport' as sqlSystem, TransNumber' as sqlTypeOfData,
+         '/Scripts/ISS/All/iss7.idc' as sqlHotLink, SqlTransNum as sqlValueMatched
+    FROM saptransport
+    WHERE sqlTransNum like '%%%SearchValue%%%'
+    UNION
+    SELECT 'SAPTransport' as sqlSystem, 'RequestorID' as sqlTypeOfData,
+         '/Scripts/ISS/All/Iss7.idc' as sqlHotLink, sqlUserID as sqlValue Matched
+    FROM saptransport
+    WHERE sqlUserID like '%%%SearchValue%%%'
+    UNION
+    SELECT 'SAPTransport' as sqlSystem, 'Contact' as sqlTypeOfData,
+         '/Scripts/ISS/All/iss7.idc' as sqlHotLink, sqlContact as sqlValueMatched
+    FROM saptransport
+    WHERE sqlContact like '%%%SearchValue%%%'
+    UNION
+    SELECT 'SAPTransport' as sqlSystem, 'Source/Destination' as sqlTypeOfData,
+         '/Scripts/ISS/All/iss7.idc' as sqlHotLink, sqlDestination as sqlValueMatched
+    FROM saptransport
+    WHERE sqlDestination like '%%%SearchValue%%%'
+    UNION
+    SELECT 'SAPTransport' as sqlSystem, 'Description' as sqlTypeOfData,
+         '/Scripts/ISS/All/iss7.idc' as sqlHotLink, sqlDesciption as sqlValueMatched
+    FROM saptransport
```

-continued

```
+       WHERE sqlDescription like '%%%SearchValue%%%'
+       UNION
+       SELECT 'SAPTransportResults' as sqlSystem, 'Description' as sqlTypeOfData,
+              '/Scripts/ISS/All/iss8.idc' as sqlHotLink, sqlDesciption as sqlValueMatched
+       FROM saptransportresults
+       WHERE sqlDescription like '%%%SearchValue%%%'
+       ORDER BY sql System, sqlTypeOf Data
SQLStatement:
+ if exists (
+    select 'TRUE'
+    where '%Context%' = 'UserChanges'
+  )
+       SELECT 'UserChanges' as sqlSystem, 'RequestorID' as sqlTypeOfData,
+              '/Scripts/ISS/All/iss13.idc' as sqlHotLink, sqlRequestUserID as sqlValueMatched
+       FROM usermanagechange
+       WHERE sqlRequestUserID like '%%%SearchValue%%%'
+       UNION
+       SELECT 'UserChanges' as sqlSystem, 'UpdatorID' as sqlTypeOfData,
+              '/Scripts/ISS/All/Iss13.idc' as sqlHotLink, sqlUpdateUserID as sqlValueMatched
+       FROM usermanagechange
+       WHERE sqlUpdateUserID like '%%%SearchValue%%%'
+       UNION
+       SELECT 'UserChanges' as sqlSystem, 'Contact' as sqlTypeOfData,
+              '/Scripts/ISS/All/Iss13.idc' as sqlHotLink, sqlContact as sqlValueMatched
+       FROM usermanagechange
+       WHERE sqlContact like '%%%SearchValue%%%'
+       UNION
+       SELECT 'UserChanges' as sqlSystem, 'Requirement' as sqlTypeOfData,
+              '/Scripts/ISS/All/Iss13.idc' as sqlHotLink, sqlRequirement as sqlValueMatched
+       FROM usermanagechange
+       WHERE sqlRequirement like '%%%SearchValue%%%'
+       UNION
+       SELECT 'UserChanges' as sqlSystem, 'TypeofRequest' as sqlTypeOfData,
+              '/Scripts/ISS/All/Iss13.idc' as sqlHotLink, sqlTypeOfRequest as sqlValueMatched
+       FROM usermanagechange
+       WHERE sqlTypeOfRequest like '%%%SearchValue%%%'
+       UNION
+       SELECT 'UserChanges' as sqlSystem, 'LevelImportance' as sqlTypeOfData,
+              '/Scripts/ISS/All/Iss13.idc' as sqlHotLink, sqlLevelImportance as sqlValueMatched
+       FROM usermanagechange
+       WHERE sqlLevelImportance like '%%%SearchValue%%%'
+       UNION
+       SELECT 'UserChanges' as sqlSystem, 'Platform' as sqlTypeOfData,
+              '/Scripts/ISS/All/Iss13.idc' as sqlHotLink, sqlPlatforms as sqlValueMatched
+       FROM usermanagechange
+       WHERE sqlPlatform like '%%%SearchValue%%%'
+       UNION
+       SELECT 'UserChanges' as sqlSystem, 'Resolution' as sqlTypeOfData,
+              '/Scripts/ISS/All/Iss13.idc' as sqlHotLink, sqlResolution as sqlValueMatched
+       FROM usermanagechange
+       WHERE sqlResolution like '%%%SearchValue%%%'
+       ORDER BY sqlSystem, sqlTypeOfData
SQLStatement:
+ if exists (
+    select 'TRUE'
+    where '%Context%' = 'Accounts'
+  )
+       SELECT 'SAPUser' as sqlSystem, 'UserID' as sqlTypeOfData,
+              '/Scripts/ISS/All/Iss9.idc' as sqlHotLink, sqlUserID as sqlValueMatched
+       FROM sapepx
+       WHERE sqlUserID like '%%%SearchValue%%%'
+       UNION
+       SELECT 'SAPUser' as sqlSystem, 'UserName' as sqlTypeOfData,
+              '/Scripts/ISS/All/Iss9.idc' as sqlHotLink, sqlUserName as sqlValueMatched
+       FROM sapepx
+       WHERE sqlUserName like '%%%SearchValue%%%'
+       UNION
+       SELECT 'SAPTransport' as sqlSystem, 'Contact' as sqlTypeOfData,
+              '/Scripts/ISS/All/Iss7.idc' as sqlHotLink, sqlContact as sqlValueMatched
+       FROM saptransport
+       WHERE sqlContact like '%%%SearchValue%%%'
+       UNION
+       SELECT 'SAPTransport' as sqlSystem, 'RequestorID' as sqlTypeOfData,
+              '/Scripts/ISS/All/Iss7.idc' as sqlHotLink, sqlUserID as sqlValueMatched
+       FROM saptransport
+       WHERE sqlUserID like '%%%SearchValue%%%'
+       UNION
+       SELECT 'NTLogon' as sqlSystem, 'UserID' as sqlTypeOfData,
+              '/Scripts/ISS/All/Iss10.idc' as sqlHotLink, sqlUserID as sqlValueMatched
```

-continued

```
+      FROM ntlogons
+      WHERE sqlUserID like '%%%SearchValue%%%'
+      UNION
+      SELECT 'NTLogon' as sqlSystem, 'UserName' as sqlTypeOfData,
+          '/Scripts/ISS/All/Iss10.idc' as sqlHotLink, sqlUserName as sqlValueMatched
+      FROM ntlogons
+      WHERE sqlUserName like '%%%SearchValue%%%'
+      UNION
+      SELECT 'NTSecurity' as sqlSystem, 'OwnerID' as sqlTypeOfData,
+          '/Scripts/ISS/All/Iss11.idc' as sqlHotLink, sqlComputerUserID as sqlValueMatched
+      FROM ntsecurity
+      WHERE sqlComputerUserID like '%%%SearchValue%%%'
+      UNION
+      SELECT 'NTSecurity' as sqlSystem, 'RequestorID' as sqlTypeOfData,
+          '/Scripts/ISS/All/Iss11.idc' as sqlHotLink, sqlRequestorID as sqlValueMatched
+      FROM ntsecurity
+      WHERE sqlRequestorID like '%%%SearchValue%%%'
+      UNION
+      SELECT 'UserChanges' as sqlSystem, 'RequestorID' as sqlTypeOfData,
+          '/Scripts/ISS/All/Iss13.idc' as sqlHotLink, sqlRequestUserID as sqlValueMatched
+      FROM usermanagechange
+      WHERE sqlRequestUserID like '%%%SearchValue%%%'
+      UNION
+      SELECT 'UserChanges' as sqlSystem, 'Contact' as sqlTypeOfData,
+          '/Scripts/ISS/All/Iss13.idc' as sqlHotLink, sqlContact as sqlValueMatched
+      FROM usermanagechange
+      WHERE sqlContact like '%%%SearchValue%%%'
+      UNION
+      SELECT 'UserChanges' as sqlSystem, 'UpdatorID' as sqlTypeOfData,
+          '/Scripts/ISS/All/Iss13.idc' as sqlHotLink, sqlUpdatUserID as sqlValueMatched
+      FROM usermanagechange
+      WHERE sqlUpdateUserID like '%%%SearchValue%%%'
+      ORDER BY sqlSystem, sqlTypeOfData
SQLStatement:
+ if exists (
+    select 'TRUE'
+    where '%Content%' = 'NTWorkstations'
+ )
+      SELECT 'NTSecurity' as sqlSystem, 'ComputerName' as sqlTypeOfData,
+          '/Scripts/ISS/All/Iss11.idc' as sqlHotLink, sqlComputerName as sqlValueMatched
+      FROM ntsecurity
+      WHERE sqlComputerName like '%%%SearchValue%%%'
+      UNION
+      SELECT 'NTSecurity' as sqlSystem, 'ComputorLocation' as sqlTypeOfData,
+          '/Scripts/ISS/All/Iss11.idc' as sqlHotLink, sqlComputerRoom as sqlValueMatched
+      FROM ntsecurity
+      WHERE sqlComputerRoom like '%%%SearchValue%%%'
+      UNION
+      SELECT 'NTSecurity' as sqlSystem, 'OwnerID' as sqlTypeOfData,
+          '/Scripts/ISS/All/Iss11.idc' as sqlHotLink, sqlComputerUserID as sqlValueMatched
+      FROM ntsecurity
+      WHERE sqlComputerUserID like '%%%SearchValue%%%'
+      UNION
+      SELECT 'NTSecurity' as sqlSystem, 'RequestorID' as sqlTypeOfData,
+          '/Scripts/ISS/All/Iss11.idc' as sqlHotLink, sqlRequestorID as sqlValueMatched
+      FROM ntsecurity
+      WHERE sqlRequestorID like '%%%SearchValue%%%'
+      UNION
+      SELECT 'NTSecurityResults' as sqlSystem, 'Description' as sqlTypeOfData,
+          '/Scripts/ISS/All/Iss12.idc' as sqlHotLink, sqlDescription as sqlValueMatched
+      FROM esotasksresults
+      WHERE sqlDescription like '%%%SearchValue%%%' and sqlRequestXref like 'NTWGen_%%'
+      ORDER BY sqlSystem, sqlTypeOfData
```

One particular advantage of the present system is that a user without familiarity with the specific aspects of security control for what may be a large number of resident applications still has the capability to process global security related transactions through a user friendly graphical user interface. Thus, in the previous example, a manager who is unfamiliar with SAP R/3 security protocols, security transactions and security files is nonetheless capable of performing transports affecting selective access to the resources available for that application.

Even more advantageous is the fact that the same user may make a global change to multiple resources without specialized knowledge and by only submitting a small number of transports. For example, while the above example only contemplated a transport affecting the selective access to a SAP R/3 resource, the same set of transports (or a subset thereof) might also affect other applications (eg. Application 2320) resident on target server 30. By way of example, application 2320 might be database program operating on data shared with the SAP R/3 subsystem.

Referring now to FIG. 7, another example of the operation of the system and method of the present invention is provided. In this example it is assumed that a corporation employing the data processing system 100 of the present invention has a large number of employees who are users of data processing system 100. Two such employee users are Gary Roberts and Chuck Nelson. Each employee is assigned a user id (UID) providing the user with primary access to the operating system of data processing system 100. In addition to the unique UID, each user is also assigned to a unique employee number as well as one of a set of divisions of the company. Additionally, each user is assigned to one JOB ID which may correspond to the employee's corporate job title. In a typical system there may be on the order of 100–1000 UIDs/users and 100–300 JOB IDs.

Additionally, in the exemplary system, each JOB ID is associated with one or more ROLEs. The ROLEs relate to particular functions and resources of data processing system 100 which may be accessed by a user being associated with a specific JOB ID. Thus, for example and referring to FIG. 7, the following table illustrates the pertinent parameters for each of the two employees.

| EMPLOYEE NAME | EMPLOYEE NUMBER | DIVISION | USER ID | JOB ID | ROLES |
|---|---|---|---|---|---|
| Roberts, Gary | 4A21 | Northeast | TDSA0124 | J4327 (Financial Clerk) | 1) Create Purchase Order (CPO) 2) Revise Purchase Order (RPO) 3) View Monthly Budget (VMB) |
| Nelson, Chuck | 7R47 | Southwest | TDSA0734 | J4327 (Financial Clerk) | 1) Create Purchase Order (CPO) 2) Revise Purchase Order (RPO) 3) View Monthly Budget (VMB) |

In the present example, both Gary Roberts and Chuck Nelson are Financial Clerks and receive the necessary rights to perform the ROLEs associated with this JOB ID. In particular, each employee, by virtue of his assigned JOB ID, is entitled to initiate three functions—Create Purchase Order, Revise Purchase Order and View Monthly Budget. Note that each function may consist of a series of transactions. In practice it is likely that each JOB ID would be entitled to perform significantly more than three functions. It is important to note that these functions are defined on a system level. In other words, the Create Purchase Order function, for example, may involve more than one software application. It may be, for instance, that in order to accomplish the Create Purchase Order function, it is necessary to access both a database application and a word processing applications. The associated permissions necessary to access each of these applications and to perform the particular tasks necessary therein are handled transparently (as far as the user is concerned) by the data processing system 100 of this invention.

FIG. 7 also illustrates that a number of transactions are associated with each ROLE. These are indicated by "T1", "T2" and "T3" for each ROLE. As may be appreciated by one having skill in the art, each ROLE may, in actuality, be accomplished by one or more transactions. Also illustrated in FIG. 7 is the fact that transactions are further broken down into objects ($O_1$ and $O_2$) that are instantiated at a very low level to implement transactions and their corresponding ROLES.

With the above background in mind, an example of the way in which system security may be modified through the teachings of the present invention is provided. Assuming that both Gary Roberts and Chuck Nelson have the system privileges as discussed above and further assuming that it is desired to subdivide specific access privileges between the two, the following method may be used according to the present invention to accomplish such a change:

Assume that it is decided that with respect to the Create Purchase Order (CPO) ROLE, Gary Roberts, since he is in the Northeast (NE) division, should only have access to the purchase orders pertaining to the Northeast region. While there are many ways of achieving this result, one particular way is to subdivide the CPO ROLE into separate CPONE and CPOSW ROLES with Mr. Roberts being permissioned only with respect to the former ROLE. In order to accomplish this, the system of the present invention operates as follows.

Step 1: Software Update—A programmer/administrator modifies (recodes) the underlying software functionality to permit operation using the two new ROLES. At this time access to the old CPO ROLE is disabled. These two operations occur within Development Environment 420 and possibly in Preproduction Environment 430 as well. Changes are typically accomplished through the use of client 10. Once the modifications have been adequately tested and are satisfactory, a TRANSPORT transaction is initiated and executed at client 10. The effect of this transaction is to move the modified software modules/components from Development Environment 420 (or Preproduction Environment 430, if applicable) to Production Environment 440. Once the revised modules have been successfully moved to Production Environment 440, step 2 may commence.

Step 2: ROLE Update—At this point it is necessary to create two new ROLES (CPO NE and CPO SW) as well as delete one existing ROLE (CPO). In order to do this an administrator working at client 10 enters three UPDATE ROLE transactions, The first creates CPONE, the second creates CPOSW and the third deletes CPO. As with the Software Update step, the ROLE Update step is accomplished through a TRANSPORT transaction which is completed by transferring the new ROLES to Production Environment 440. Thus, after the TRANSPORT has been accomplished, the appropriate security files now contain information reflecting the relationships illustrated in the "After" section of FIG. 7. In other words, the applicable security file located on Server 20 includes, among other ROLES, the CPONE ROLE, the CPOSW ROLE, the ROP ROLE and the VMB ROLE.

Step 3: JOB Update—Next, since new ROLEs have been defined and since existing ROLES have been deleted, JOBs referencing obsolete ROLES must be modified and replaced with references to the newly added ROLEs. In this particular case, two new JOBs are added and one JOB is deleted. Thus, a TRANSPORT is initiated in order to create new JOBs J4327NE and J4327SW. Additionally, JOB J4327 is deleted.

This step also includes the assignment of ROLEs to the newly created JOBs. In this case ROLEs CPONE, RPO and VMB are associated with JOB J4327NE. Further, ROLEs CPONE, CPOSW, RPO and VMB are associated with JOB J4327SW. Note that JOB J4327SW (to be Chuck Nelson's JOB) retains rights to perform the CPONE ROLE, while JOB J4327NE does not retain the right to the CPOSW ROLE.

Step 4: Employee Update—In this step, Gary Roberts is assigned to the J4327NE JOB and Chuck Nelson is assigned to the J4327SW JOB. As such, each employee is now associated with a JOB that contains the ROLEs determined to be necessary to perform that job function on only those ROLEs.

While a particular embodiment of the present invention has been described and illustrated, it should be understood that the invention is not limited thereto since modifications may be made by persons skilled in the art while still falling within the scope and spirit of the appended claims.

I claim:

1. A security application wherein:
    the security application is adapted to communicate with a client, a first target application, and a second target application;
    the security application is adapted to communicate with first security provisions associated with the first target application, the first security provisions being adjustable;
    the security application is adapted to communicate with second security provisions associated with the second target application, the second security provisions being adjustable;
    the security application is adapted to communicate with a manager and receive information from the manager; and
    wherein the security application can adjust the first security provisions associated with the first target application and the second security provisions associated with the second target application based on the information received from the manager, thereby controlling the client's access to the first target application and the second target application.

2. The application according to claim 1, wherein the first security provisions include a security file.

3. The application according to claim 1, wherein the second security provisions include a security file.

4. The application according to claim 1, wherein the security application is adapted to reside on a server.

5. The application according to claim 1, wherein the security application is adapted to communicate with the first target application and the second target application when the first target application and the second target application reside on a first server, and wherein the security application is adapted to reside on a second server that is different from the first server.

6. The application according to claim 1, wherein the security application is adapted to communicate with a second client.

7. The application according to claim 6, wherein the security application can adjust the first security provisions associated with the first target application and the second security provisions associated with the second target application based on the information received from the manager, thereby controlling the second client's access to the first target application and the second target application.

8. A security system for managing access comprising:
    a security server adapted to communicate with a client, a first target application, a second target application and a manager;
    the first target application including a first set of information related to first security provisions, and wherein the first security provisions are adjustable;
    the second target application including a second set of information related to access rights second security provisions, wherein the second secunty provisions are adjustable; and
    wherein the security server adjusts the first security provisions associated with the first target application or the second security provisions associated with the second target application, based on instructions received from the manager.

9. The system according to claim 8, wherein the first set of information is stored in a security file.

10. The system according to claim 8, wherein the second set of information is stored in a security file.

11. The system according to claim 8, wherein the security server includes a security application.

12. The system according to claim 11, wherein the security application is adapted to communicate with the first target application and the second target application when the first target application and the second target application reside on a first server, and wherein the security application is adapted to reside on a second server that is different from the first server.

13. The system according to claim 11, wherein the security application is adapted to communicate with a second client.

14. The system according to claim 13, wherein the security application can adjust the first security provisions associated with the first target application and the second security provisions associated with the second target application based on the information received from the manager, thereby controlling the second client's access to the first target application and the second target application.

* * * * *